US012719681B2

(12) United States Patent
Khawand et al.

(10) Patent No.: US 12,719,681 B2
(45) Date of Patent: Aug. 25, 2026

(54) NON-CONTACT AUTHENTICATION FOR KEY RECOVERY AND PLATFORM SECURITY PROVISIONING

(71) Applicant: Microsoft Technology Licensing, LLC, Redmond, WA (US)

(72) Inventors: Charbel Khawand, Sammamish, WA (US); Andrew James Hillenius, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 83 days.

(21) Appl. No.: 18/628,113

(22) Filed: Apr. 5, 2024

(65) Prior Publication Data

US 2025/0317295 A1 Oct. 9, 2025

(51) Int. Cl.
*H04L 9/32* (2006.01)
*H04L 9/08* (2006.01)

(52) U.S. Cl.
CPC .......... *H04L 9/3213* (2013.01); *H04L 9/0877* (2013.01)

(58) Field of Classification Search
CPC ............................ H04L 9/3213; H04L 9/0877
See application file for complete search history.

(56) References Cited

U.S. PATENT DOCUMENTS 9,571,164 B1 * 2/2017 Luo .......................... H04B 5/77
10,313,123 B1 * 6/2019 Grubin .................. H04L 9/0838
10,805,802 B1 10/2020 Yau (Continued)

FOREIGN PATENT DOCUMENTS

CN 106330440 A 1/2017
WO 2020089484 A1 5/2020

OTHER PUBLICATIONS

Hufstetler, et al., "NFC unlock: Secure two-factor computer authentication using NFC", In 2017 IEEE 14th International Conference on Mobile Ad Hoc and Sensor Systems (MASS) Oct. 22, 2017, pp. 507-510.

(Continued)

*Primary Examiner* — Henry Tsang
(74) *Attorney, Agent, or Firm* — Weaver IP L.L.C.

(57) ABSTRACT

Secure AI authentication is implemented for selectable environments with a selectable combination of ML models processing selectable input credentials, e.g., biometric and/or non-biometric credentials, such as a key associated with a secure model, user location information, a user gesture credential, and/or a user movement pattern credential. ML models may be selectively applied in serial or parallel in a selected authorization procedure. ML model applicability may vary based on one or more parameters, such as time of day, or one or more detected input credentials, such as user gestures, secure model keys, or biometric voice or face recognition. For example, AI authorization (e.g., for biometric credentials) augmented with an ultra-wideband (UWB) communication protocol provides robust user authentication via a native cryptographic exchange and accurate user location credentials for proximity and geofenced confirmation of other user credentials, such as biometric credentials, thereby preventing false positives by spoofing.

20 Claims, 5 Drawing Sheets

(56) References Cited

U.S. PATENT DOCUMENTS

| | | | |
|---|---|---|---|
| 2012/0239936 | A1 | 9/2012 | Holtmanns et al. |
| 2013/0125231 | A1 | 5/2013 | Kuenzi |
| 2014/0026202 | A1 | 1/2014 | Lo |
| 2015/0143508 | A1 | 5/2015 | Moishe |
| 2016/0261411 | A1 | 9/2016 | Yau et al. |
| 2017/0329958 | A1 * | 11/2017 | Hitchcock ............. H04L 9/3268 |
| 2023/0209355 | A1 | 6/2023 | Nam |

OTHER PUBLICATIONS

Extended European search report received for European Application No. 25168466.8, mailed on Jun. 10, 2025, 10 pages.
Communication pursuant to Article 94(3) EPC received for EP Application No. 25168466.8, mailed on May 21, 2026, 09 pages.

* cited by examiner

500

Receive a user credential synchronization request comprising a key manifest for a secure component from a host device in response to a user credential synchronization request provided by the host device to the secure component following authentication of a secure token received by the host device from the secure component

502

Determine whether the key manifest provided by the secure component is synchronized with user credentials in a user credential store managed by the server

504

In response a determination the key manifest is unsynchronized based on the absence of one or more user credentials, transmit the one or more absent user credentials to the host device for transmission to the secure component to synchronize the user credentials in the secure component with the user credential store managed by the server

NON-CONTACT AUTHENTICATION FOR KEY RECOVERY AND PLATFORM SECURITY PROVISIONING

BACKGROUND

"Authentication" is the act of proving an assertion such as the identity of a computer system user. In contrast with identification, which is the act of indicating identity, authentication is the process of verifying that identity. Various techniques are used in computer systems to perform authentication of a user, such as by receiving a passcode provided by the user, detecting a biometric factor associated with the user, exchanging a communication with a device of the user, etc. The received factor of the user may be compared to a known factor of the user to authenticate the user. "Single-factor" authentication may be performed, which uses a single received aspect (e.g., a passcode) to authenticate the user, or "multi-factor" authentication may be performed, which uses multiple received aspects (e.g., passcode and fingerprint) to authenticate the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Non-contact authentication for key recovery and platform security provisioning is disclosed herein. Access credentials are backed up to and recovered from a user device, such as a smart card, utilized as a secondary root of trust. Automatic, secure backup and storage of security related information (e.g., user authentication keys, user credentials, crypto tokens, disc encryption recovery key keys, etc.) occurs wirelessly onto one or more personal accessories, such as a secure near-field communication (NFC) card or a mobile embedded secure component. Access to store and retrieve can be further enhanced with geo location presence detection provided via a wireless interface.

In a further aspect, a secure information backup/synchronization and recovery service provides an interface for an administrator/user to specify a backup procedure and a recovery procedure to access the backed up information. Information to be backed up to secure storage in a user device may be configured, such as trusted platform module (TPM), disc encryption recovery key, file encryption, and/or account credentials. A user can authenticate during a recovery procedure to retrieve keys backed up on a user device via any configured method. Automated backup/synchronization is triggered by one or more configured conditions, such as successful authentication, resulting in automated backup of all configured secure access credentials to one or more designated destinations. Credential backup synchronization to a user device may be triggered periodically or aperiodically, for example, by successful user authentication during a login procedure.

In one aspect, a method of non-contact authentication for key recovery and platform security provisioning, implemented by a user device, comprises: retrieving a secure token from secure storage in the secure component; wirelessly providing the secure token to a host device performing user authentication; if the user is authenticated by the host device, receiving a user credential synchronization request from the host device; providing a key manifest to the host device in response to the user credential synchronization request; if the key manifest is determined to be unsynchronized based on the absence of one or more user credentials, receiving the one or more absent user credentials; and storing the received one or more absent user credentials in the secure storage to synchronize the user credentials with at least one external user credential store.

According to another aspect, a method of non-contact authentication for key recovery and platform security provisioning, implemented by a host device, comprises: wirelessly receiving a secure token from secure storage in an external secure component; performing user authentication based on the secure token; if the user is authenticated, transmitting a user credential synchronization request to the secure component; receiving a key manifest from the secure component in response to the user credential synchronization request; if the key manifest is determined to be unsynchronized based on the absence of one or more user credentials, transmitting the one or more absent user credentials to the secure component for storage in the secure storage to synchronize the user credentials in the secure component with a user credential store.

According to still another aspect, a method of non-contact authentication for key recovery and platform security provisioning, implemented by a server, comprises: receiving a user credential synchronization request comprising a key manifest for a secure component from a host device in response to a user credential synchronization request provided by the host device to the secure component following authentication of a secure token received by the host device from the secure component; determining whether the key manifest provided by the secure component is synchronized with user credentials in a user credential store managed by the server; and if the key manifest is determined to be unsynchronized based on the absence of one or more user credentials, transmitting the one or more absent user credentials to the host device for transmission to the secure component to synchronize the user credentials in the secure component with the user credential store managed by the server.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 5 shows a flowchart of a process for implementing non-contact authentication for key recovery and platform security provisioning in a server, in accordance with an embodiment.

Figure 1:
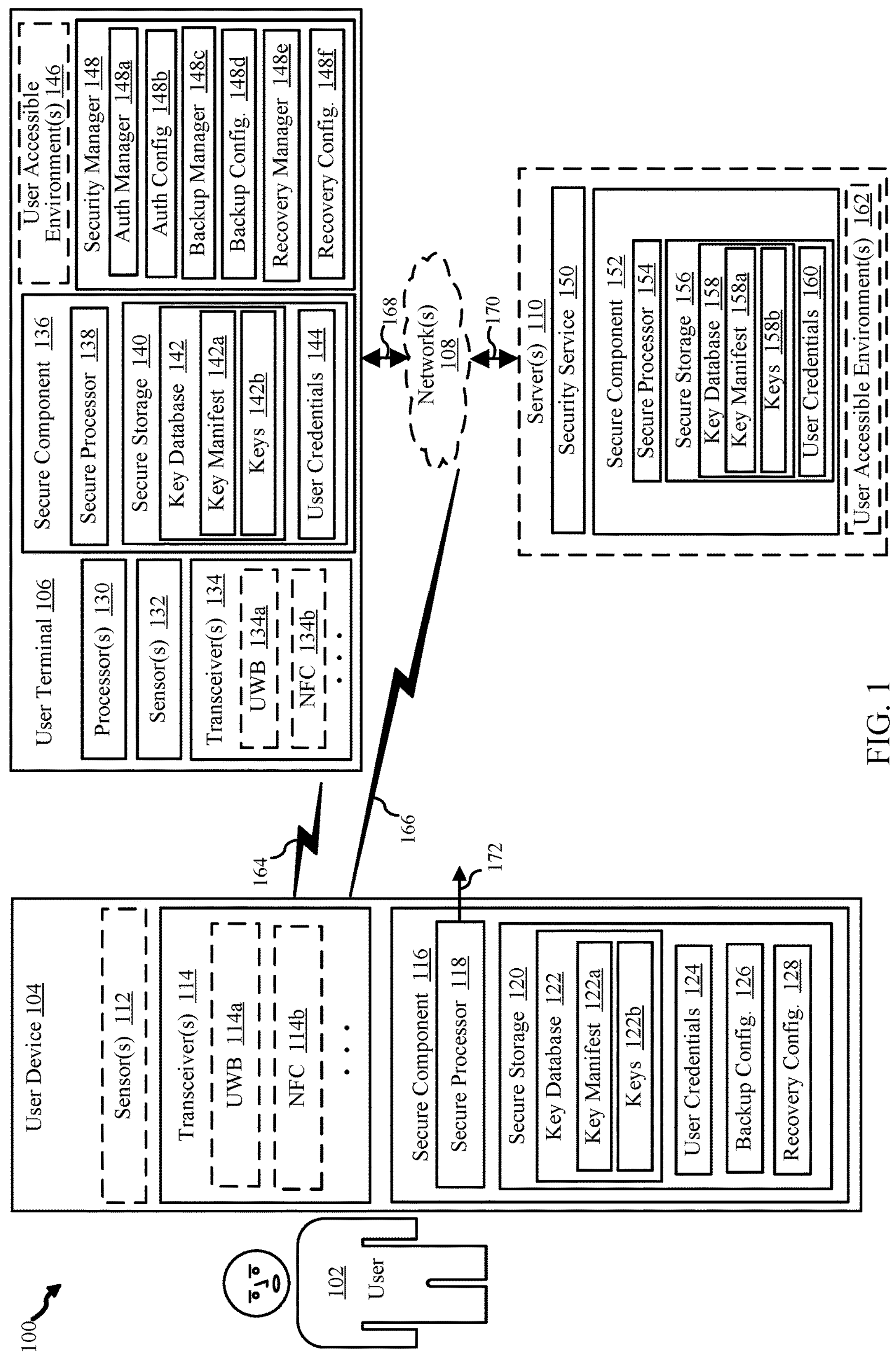
FIG. 1 shows a block diagram of an example system configured for non-contact authentication for key recovery and platform security provisioning, in accordance with embodiments.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Various techniques are used in computer systems to perform authentication of a user, such as receiving a passcode provided by the user, a physical biometric factor associated with the user (e.g., a fingerprint, an image such as a facial scan), a behavior-related biometric factor associated with the user (e.g., keyboard dynamics, gait recognition, hand gestures), a device of the user (e.g., an ID card, a security token) etc. The received factor of the user is compared to a known factor of the user to authenticate the user. Single-factor authentication may be performed, which uses a single received factor to authenticate the user, or multi-factor authentication may be performed, which uses multiple received factors to authenticate the user.

Storing recovery tokens remotely (e.g., in the cloud) requires a secure connection in order to retrieve a secure challenge and apply its output to a local machine. Keeping authentication tokens only in the cloud may also utilize a VPN (virtual private network) connection to an IT (information technology) cloud-based application and user verification with additional inputs. For example, a full volume/disc encryption component can go into failsafe mode where it needs to be presented with encryption keys to unlock a local machine. A user has to manually enter a backed up encryption key or go to an information technology (IT) service to have the machine reprovisioned. In contrast, non-contact authentication for key recovery and platform security provisioning provides automated entry of the encryption keys to restore the system state. Automated backup/synchronization and recovery of keys in one or more user devices saves time and money by supporting swift access and recovery.

Embodiments described herein enable non-contact authentication for key recovery and platform security provisioning. Access credentials are backed up to and recovered from a user device, such as a smart card, utilized as a secondary root of trust. Automatic, secure backup and storage of user authentication keys, crypto tokens, disc encryption recovery keys, etc. occurs wirelessly onto one or more personal accessories, such as a secure near-field communication (NFC) card or a mobile embedded secure component. For example, NFC enabled devices can auto-save secure information in secure storage vaults that are already part of the NFC subsystem when they successfully 'tap to' authenticate to access a host computing system. Access to store and retrieve can be further enhanced with geo location presence detection, e.g., using ultra-wideband (UWB). Credentials can be recovered from secure storage in a user device via a wireless interface, such as NFC or UWB.

A secure information backup/synchronization and recovery service provides an interface for an administrator/user to specify a backup procedure (e.g., indicating what secure key/credential information to backup, when, where, and how) and a recovery procedure to access the backed up information. Information to be backed up to secure storage in a user device may be configured, such as trusted platform module (TPM), disc encryption recovery key, file encryption, and/or account credentials. A user can authenticate during a recovery procedure to retrieve keys backed up on a user device via any configured method, such as password, geofence, trusted third party, etc. Automated backup/synchronization is triggered by one or more configured conditions, such as successful authentication, resulting in automated backup of all configured secure access credentials to one or more designated destinations (e.g., one or more secure user devices or other secure locations). Credential backup synchronization to a user device may be triggered periodically or aperiodically, for example, by successful user authentication during a login procedure. For example, when a user logs in to a host device with an NFC-enabled smart card (SC), designated keys (e.g., disc encryption recovery key) are backed up into a secure component (SE) in the NFC-enabled SC and/or one or more other secure locations indicated to the service.

In one aspect, a method of non-contact authentication for key recovery and platform security provisioning, implemented by a user device, comprises: retrieving a secure token from secure storage in the secure component; wirelessly providing the secure token to a host device performing user authentication; if the user is authenticated by the host device, receiving a user credential synchronization backup request from the host device; providing a key manifest to the host device in response to the user credential synchronization request; if the key manifest is determined to be unsynchronized based on the absence of one or more user credentials, receiving the one or more absent user credentials; and storing the received one or more absent user credentials in the secure storage to synchronize the user credentials with at least one external user credential store. In this manner, missing (absent) user credentials are backed up in the secure storage, thereby synchronizing the user device with the external user credential store (e.g., a user terminal, a server, or other credential store), thereby providing for redundant storage.

According to another aspect, a method of non-contact authentication for key recovery and platform security provisioning, implemented by a host device, comprises: wirelessly receiving a secure token from secure storage in an external secure component; performing user authentication based on the secure token; if the user is authenticated, transmitting a user credential synchronization backup request to the secure component; receiving a key manifest from the secure component in response to the user credential synchronization request; if the key manifest is determined to be unsynchronized based on the absence of one or more user credentials, transmitting the one or more absent user credentials to the secure component for storage in the secure storage to synchronize the user credentials in the secure component with a user credential store.

According to still another aspect, a method of non-contact authentication for key recovery and platform security provisioning, implemented by a server, comprises: receiving a user credential synchronization request comprising a key manifest for a secure component from a host device in response to a user credential synchronization request provided by the host device to the secure component following authentication of a secure token received by the host device from the secure component; determining whether the key manifest provided by the secure component is synchronized with user credentials in a user credential store managed by the server; and if the key manifest is determined to be unsynchronized based on the absence of one or more user credentials, transmitting the one or more absent user credentials to the host device for transmission to the secure component to synchronize the user credentials in the secure component with the user credential store managed by the server.

These and further embodiments may be implemented in various ways. To help illustrate such embodiments, FIGS. 1-6 are described as follows. In particular, FIG. 1 shows a block diagram of an example system 100 configured for non-contact authentication for key recovery and platform security provisioning, in accordance with embodiments. System 100 includes a user device 104, a user terminal 106, and one or more servers 110, which are communicatively coupled by one or more networks 108. User device 104 includes one or more sensor(s) 112, one or more transceivers 114, and a secure component 116 that includes a secure processor 118 and secure storage 120. Terminal device 106, also referred to herein as "host device," includes one or more central processing units (CPUs) 130, one or more sensors 132, one or more transceivers 134, a secure component 136 that includes a secure processor 138 and secure storage 140, one or more user accessible environments 146, and a security manager 148. Transceiver(s) 114 includes a UWB interface 114*a* and an NFC interface 114*b*. Transceiver(s) 134 includes a UWB interface 134*a* and an NFC interface 134*b*. Each server of server(s) 110 includes a security service 150, a secure component 152 that includes a secure processor 154 and secure storage 154, and one or more user accessible environments 162. Dashed lines indicate components or subcomponents may or may not be present in a variety of implementations. These features of FIG. 1 are described in further detail as follows.

User device 104 comprises one or more passive or active devices that transmit one or more user authorization, identification, or access credentials, such as a tag, a badge, a cellular phone, a beacon, a fob, a watch, a pen, a wearable device, etc. Note that any number of user devices 104 may be present in system 100, including tens, hundreds, thousands, millions, and even greater numbers of user devices 104.

Sensor(s) 112 include a wide variety of sensors used to detect information pertaining to one or more user credentials, such as a camera, a microphone, a fingerprint reader, an accelerometer, a global positioning system (GPS) sensor, a presence detector (e.g., RADAR), and so on. Sensor(s) 112, as indicated by dashed lines, may or may not be present in one or more types of user devices 104, such as a cellular/mobile phone, smart card, smart watch, etc.

Transceiver(s) 114 provide wireless and/or wired communications including a communication 164 between user device 104 and user terminal 106 and/or a communication 166 between user device 104 and server(s) 110. Such communications may be conducted over a wired or wireless network interface, such as, for example, one or more of the following wired or wireless interfaces: a UWB interface 114*a*, a near field communication (NFC) interface 114*b*, an IEEE 802.11 wireless LAN (WLAN) wireless interface (e.g., a WiFi interface), a Worldwide Interoperability for Microwave Access (Wi-MAX) interface, an Ethernet interface, a Universal Serial Bus (USB) interface, a cellular network interface, a Bluetooth™ interface, etc. In an example, user device 104 is a UWB-enabled device. NFC interface 114*b* can be, for example, a listener. Further examples of network interfaces that may be incorporated in user device 104 are described elsewhere herein.

In some example implementations, UWB provides useful metadata as contextual inputs for user credentials 124, such as time of flight and angle of arrival, which may be used as user location credentials to verify a location or proximity of user 102 relative to user terminal 106, allowing user terminal 106 (e.g., security manager 148) to geofence around user 102 and user device 104.

Communications 164, 166 may pertain, for example, to user credentials 124 (e.g., password, face recognition, voice recognition), secure keys 122*b*, key manifest 122*a*, authentication/authorization determinations, sensed information, a secure information (e.g., credential/key) backup operation (e.g., to provide a key manifest 122*b*, receive missing keys 122*b*, receive configuration 126, 128), a secure information (e.g., credential/key) recovery operation (e.g., to receive a recovery configuration 128, receive a recovery request, provide recovery information), etc. In some examples, secure user device 104 captures (e.g., samples or detects) biometric or other information. In some examples, secure user device 104 provides (e.g., and may collect) user credentials (e.g., fingerprint or other biometric or no-biometric information) for user 102 to user terminal 106 for user authentication, backup operations, and/or recovery operations. For example, secure component 116 may cause a transceiver or transceiver(s) 114 to send or receive user credentials 124, keys 122*b*, and/or key manifest 122*a* based on executable code associated with one or more operations executed by secure processor 118.

Secure component 116 represents a secure platform module, such as a trusted platform module (TPM). Secure component 116 provides an isolated secure environment not affected by other software (e.g., malware) that may exist on user device 104 outside of secure component 116. Secure component 116 includes secure processor 118 and secure storage 120. Secure component 116 includes a secure operating system (OS) (not shown) executed by secure processor 118.

Secure storage 120 includes any data an administrator/user seeks to protect, such as key database 122, user credentials 124, backup configuration 126, recovery configuration 128, etc. Key database 122 includes key manifest **122*a* and keys 122*b*. Key manifest 122*a* indicates each key among keys 122*b*. Keys 122*b* are used to generate a secure token 172 to be transmitted to user terminal 106 in communication 164 and/or to server(s) 110 via network(s) 108 in communication 166. Keys 122*b* include, for example, public keys, private keys, cloud keys, and/or secure shell (SSH) keys. Secure token 172** can be, for example, a wrapped version of a data encryption key protected by a user credential, such as a user password.

Secure processor 118 is a tamper-resistant processor that protects secure assets stored in secure storage 120, such as a root of trust, sensitive data, such as user credentials 124, keys **122*b*, key manifest 122*a*, certificates, a disc encryption recovery key, applications, backup/synchronization configuration 126, recovery configuration 128, etc. against attacks attempting to use software or hardware. Secure processor 118 processes executable code (e.g., programs or applications) to perform operations that access, modify, send, receive, and store data in secure storage 120**.

Secure processor 118 executes operations to backup/synchronize secure information stored in secure storage 120 and to recover secure information stored in secure storage 120. Secure processor 118, for example, provides key manifest **122*a* to user terminal 106 and/or to server(s) 110 to determine whether user device 104 is synchronized with user terminal 106 and/or server(s) 110 in terms of secure information stored in secure storage 120. The secure information subject to backup and recovery can be fixed or variable based on configuration. For example, backup configuration 126 can indicate which information is backed up and conditions for backing up, such as following successful authentication and/or additional user credentials. For example, recovery configuration 128 can indicate which information is recoverable and conditions for recovery, such as user credentials. User credentials 124** include one or more types of credentials, such as biometric, non-biometric, location, non-location, contactless, contact, and so on. For example, user credentials can include user location credential(s), such as three dimensional (3D) position, geo-location, and/or RADAR, and/or non-location credential(s), such as face recognition, voice recognition, gesture(s), movement pattern(s), key(s), and/or time and date.

In an example, user 102 approaches user terminal 106, which may be a computing device such as a tablet. User 102 is carrying user device 104, which may be a smart card. User taps user device 104 on user terminal 106 to authenticate and log user 102 into user terminal 106. User device 104 and user terminal 106 communicate messages pertaining to authentication, for example, using NFC. User device 104 provides secure token 172 comprising one or more keys **122*b* secured by a user password in user credentials 124. User terminal 106 may transmit a user credential synchronization request to user device 104 as a request that user 102 enter a secondary credential such as a password to confirm the user 102 is associated with user device 104. In the background, user terminal 106 requests that user device 104 engage in secure information synchronization, e.g., following successful authentication of user 102. User device 104 provides key manifest 122*a* (e.g., and/or other list of information secured in secure storage 120) to user terminal 106. User terminal 106 compares key manifest 122*a* (e.g., and/or other list of information secured in secure storage 120) with secure information stored by user terminal 106 for user 102. User terminal 106 may provide the key manifest 122*a* (e.g., and/or other list of information secured in secure storage 120) to server(s) 110, which may (e.g., additionally or alternatively) compare key manifest 122*a* (e.g., and/or other list of information secured in secure storage 120) with secure information stored by user terminal 106 for user 102. Server(s) 110 and/or user terminal 106 provide any absent secure information (e.g., keys, user credentials) to user device 104 (e.g., in encrypted form) for storage in secure storage 120 to synchronize user device 104 with user terminal 106 and/or server(s) 110 regarding storage of secure information for authentication of user 102. Synchronization supports continuing ability to use user device 104** for user authentication and swift user credential recovery.

User device 104 can be configured to, alternatively or additionally, communicate via communications 166 and communications 170 with security service 150 in server(s) 110, which can manage user authentication for user 102 and other users to access user accessible environment(s) 162. For example, user device 104 can be a cellular phone configured to communicate with server(s) 110 via an internet connection carried over a cellular communication network 108. Security service 150 in server(s) 110 may be configured similarly to security manager 148 in user terminal 106.

User terminal 106 is any type of device utilizing user authentication, e.g., for user identification or authorization. User terminal 106 is fixed or mobile, such as a mobile phone or other mobile computing environment, a desktop computer, an operating system, a network environment, a building, an automobile, and so on. User terminal 106 provides access to one or more user accessible environments 146. User accessible environment(s) 146 comprise one or more environments in user terminal 106 that user 102 may be granted access to based on user authentication performed by security manager 148. An example of user accessible environment 146 is the operating system of user terminal 106, building access, etc. In some examples, user terminal 106 is a computing system permitting authorized users to access user accessible environments 146, such as a computing device, a computing network, a computing service (e.g., cloud service), computing resources, data, etc. In some examples, user terminal 106 is configured to pair or not pair an input, output, or peripheral device (e.g., pen, mouse, keyboard, headset) with a computing system based on a user determination. In some examples, user terminal 106 is a financial or payment system permitting authorized user to access user records, make or receive payments, etc. User terminal 106 includes one or more processors 130, one or more sensor(s) 132, one or more transceivers 134, a secure component 136 with a secure processor 138 and secure storage 140, one or more user accessible environments 146, and a security manager 148. Note that any number of user terminals 106 may be present in system 100, including tens, hundreds, thousands, millions, and even greater numbers of user devices 104.

Figure 6:
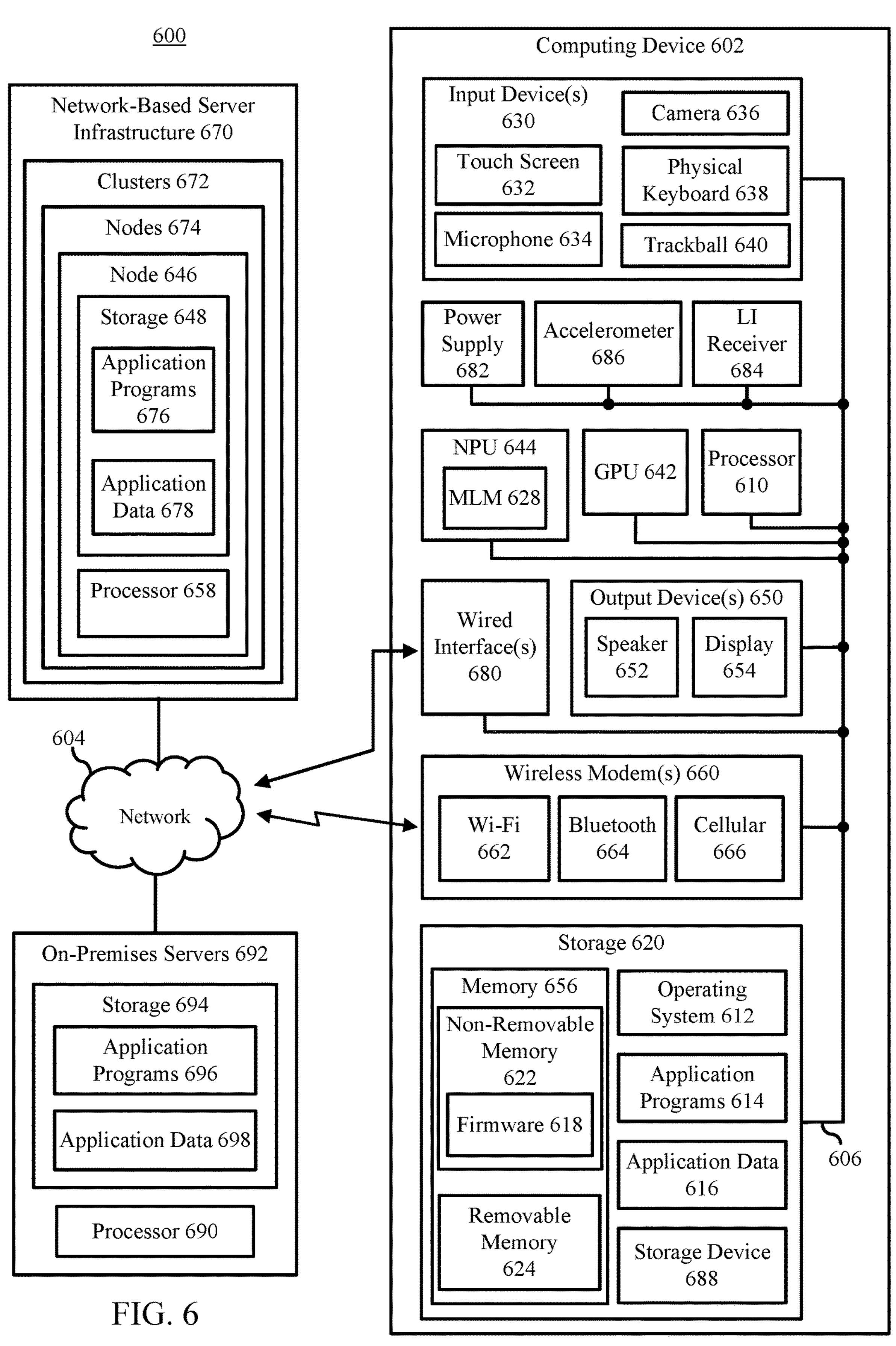
FIG. 6 shows a block diagram of an example computer system in which embodiments may be implemented.

Processor(s) 130 is/are as described in FIG. 6 as processor 610. Processor(s) 130 execute an operating system (not shown) and applications, for example, to perform detection using sensor(s) 132 and communication via transceiver(s) 134.

Sensor(s) 132 include a wide variety of sensors used to detect information pertaining to one or more user credentials, such as a camera, a microphone, a fingerprint reader, an accelerometer, a global positioning system (GPS) sensor, a presence detector (e.g., RADAR), and so on.

Transceiver(s) 134 provide wireless and/or wired communication, for example, communication 164 between user device 104 and user terminal 106 and/or communication 168 between user terminal 106 and network(s) 108. Communication may be provided by a wired or wireless network interface, such as, for example, one or more of the following wired or wireless interfaces: a UWB interface 134*a*, an IEEE 802.11 wireless LAN (WLAN) wireless interface (e.g., a WiFi interface), a Worldwide Interoperability for Microwave Access (Wi-MAX) interface, an Ethernet interface, a Universal Serial Bus (USB) interface, a cellular network interface, a Bluetooth™ interface, a near field communication (NFC) interface 134*b*, etc. For example, user terminal 106 and user device 104 may be UWB-enabled. NFC interface 134*b* can be, for example, a reader/poller. Further examples of network interfaces that may be incorporated in user terminal 106 and user device 104 are described elsewhere herein.

Communications 164, 168 may pertain, for example, to user credentials 124/144/160 (e.g., password, face recognition, voice recognition), secure keys 122*b*/142*b*/158*b*, key manifest 122*a*/142*a*/158*a*, authentication/authorization determinations, sensed information, a secure information (e.g., credential/key) backup operation (e.g., to receive or provide a key manifest 122*a*/142*a*/158*a*, receive or provide missing keys 122*b*/142*b*/158*b*, receive or provide configuration 126/148*d*, 128/148*f*), a secure information (e.g., credential/key) recovery operation (e.g., to receive a recovery configuration 128/148*f*, receive a recovery request, provide recovery information), etc. In various examples, secure user device 104 and/or user terminal 106 captures (e.g., samples or detects) biometric or other information. In some examples, (e.g., UWB-enabled and/or NFC-enabled) secure user device 104 provides (e.g., and may collect) user credentials (e.g., fingerprint or other biometric or no-biometric information) for user 102 to user terminal 106 for user authentication, backup operations, and/or recovery operations. For example, secure component 116 may cause transceiver(s) 114 to send or receive user credentials 124, keys 122*b*, and/or key manifest 122*a* based on executable code associated with one or more operations executed by secure processor 118.

Secure component 136 represents a secure platform module, such as a trusted platform module (TPM). Secure component 136 provides an isolated secure environment not affected by other software (e.g., malware) that may exist on user terminal 106 outside of secure component 136. Secure component 136 includes secure processor 138 and secure storage 140. Secure component 136 includes a secure operating system (OS) (not shown) executed by secure processor 138.

Secure storage 140 includes any data an administrator/user seeks to protect, such as key database 142, user credentials 144, etc. Key database 142 includes key manifest 142*a* and keys 142*b*. Key manifest 142*a* indicates each key among keys 142*b*. Keys 142*b* may be provided to user device 104 as keys 122*b* to use to generate secure token 172 to be transmitted to user terminal 106 in communication 164 and/or to server(s) 110 via network(s) 108 in communication 166. Keys 142*b* include, for example, one or more of public keys, private keys, cloud keys, and/or secure shell (SSH) keys. The contents of secure storage 140 may be synchronized to and recovered from secure storage 120.

Secure processor 138 is a tamper-resistant processor that protects secure assets stored in secure storage 140, such as a root of trust, sensitive data, such as user credentials 144, keys 142*b*, key manifest 142*a*, certificates, disc encryption recovery key, applications, etc. against attacks attempting to use software or hardware. Secure processor 138 processes executable code (e.g., programs or applications) to perform operations that access, modify, send, receive, and store data in secure storage 140.

Secure processor 138 executes operations to provide backup configuration 148*d* and recovery configuration 148*f* to user device 104 to store as backup configuration 126 and recovery configuration 128, respectively, to backup/synchronize secure information stored in secure storage 140 with secure information stored in secure storage 120, and to recover secure information stored in secure storage 120. Secure processor 138, for example, receives key manifest 122*a* from user device 104 to determine whether user device 104 is synchronized with user terminal 106 and/or server(s) 110 in terms of secure information stored in secure storage 120 and secure information stored in secure storage 140. The secure information subject to backup and recovery can be fixed or variable based on configuration. For example, backup configuration 148*d* can indicate which information is backed up and conditions for backing up, such as following successful authentication and/or additional user credentials (which improve the reliability of the authentication, such as through multi-factor authentication). For example, recovery configuration 148*f* can indicate which information is recoverable and conditions for recovery, such as user credentials. User credentials 144 include one or more types of credentials, such as biometric, non-biometric, location, non-location, contactless, contact, and so on. For example, user credentials can include user location credential(s), such as three dimensional (3D) position, geo-location, and/or RADAR, and/or non-location credential(s), such as face recognition, voice recognition, gesture(s), movement pattern(s), key(s), and/or time and date.

Security manager 148 implements user authentication, backup/synchronization, and recovery operations, such as configuration and implementation. An administrator of user terminal 106 (e.g., user 102) uses one or more interfaces provided by security manager 148 to specify user authentication procedures and associated user credentials 148*f*, backup/synchronization configuration 148*d*, recovery configuration 148*f*, etc. Keys 142*b* (and key manifest 142*a* based on keys 142*b*) may be static or dynamic, e.g., generated by a key generator (not shown). Security manager 148 may store user credentials 144 in secure storage 140. User terminal 106 provides keys 142*b*, user credentials 144, backup configuration 148*b*, and recovery configuration 148*f* to user device 104 for storage in secure storage 120 and use in user authentication, secure information backup and recovery operations involving user 102 and user terminal 106.

Security manager 148 includes, for example, authentication manager 148*a*, backup manager 148*c*, and recovery manager 148*e*. Authentication manager 148*a* is configured to provide an interface for an administrator of user accessible environment(s) 146 to configure a user authentication procedure and associated user credentials for user 102. Authentication manager 148*a* is configured to generate authentication configuration 148*b*. In an example, authentication manager 148*a* is an authenticator that performs the authentication procedure based on authentication configuration 148*b*.

Backup manager 148*c* is configured to provide an interface for an administrator of user accessible environment(s) 146 to configure a backup/synchronization procedure for secure information stored in secure storage 120 relative to secure information stored in secure storage 140 pertaining to user 102 and user device 104. Backup manager 148*c* is configured to generate backup configuration 148*d*. Backup manager 148*c* can be a synchronizer that performs the backup/synchronization procedure based on backup configuration 148*d*.

Recovery manager 148*e* is configured to provide an interface for an administrator of user accessible environment(s) 146 to configure a recovery procedure using secure information stored in secure storage 120 to recover secure information stored in secure storage 140 pertaining to user 102 and user device 104. Recovery manager 148*e* is configured to generate recovery configuration 148*f*. Recovery configuration 148*f* includes configuration information configured by the administrator (or other user) and indicates information that is recoverable and conditions for recovery of the information, providing all this information in a convenient package. In an example, recovery manager 148*e* is a recoverer that performs the recovery procedure based on recovery configuration 148*f*.

Security manager 148 is configured to communicate with security service 150 in server(s) 110, which manages user authentication for user 102 and other users to access user accessible environment(s) 162. Security manager 148 is configured to communicate with user device 104. User device 104 can communicate with server(s) 110 indirectly via local communications 164 and network communications 168, 170, and/or directly via network communications 166.

Network(s) 108 comprises one or more networks such as local area networks (LANs), wide area networks (WANs), Public Land Mobile Networks (PLMNs), enterprise networks, the Internet, etc., and may include one or more of wired and/or wireless portions. User device 104, user terminal 106, and/or server(s) 110 may communicate with each other via network(s) 108 to implement ML model creation, training, deployment, and/or user authorization.

Server(s) 110 comprises one or more computing devices, servers, services, local processes, remote machines, web services, etc. configured for executing security service 150, storing secure information for user 102 and other users in secure component 152, synchronizing the secure information, and providing access to user accessible environment(s) 162. In an example, server(s) 110 comprises a server located on an organization's premises and/or coupled to an organization's local network, a remotely located server, a cloud-based server (e.g., one or more servers in a distributed manner), or any other device or service that may host, manage, and/or provide resource(s) for execution of security service 150, storing secure information for user 102 and other users in secure component 152, synchronizing the secure information, and/or providing access to user accessible environment(s) 162. Server(s) 110 may be implemented as a plurality of programs executed by one or more computing devices. In examples, user accessible environment(s) 162 include computer network applications (e.g., word processing, job processing), real estate access card readers, financial/banking applications, etc.

Security service 150 of server(s) 110 implements user authentication, backup/synchronization, and recovery operations, such as configuration and implementation. Security service 150 may be configured similarly to security manager 148 in user terminal 106. An administrator of server(s) 110 can use one or more interfaces provided by security service 150 to (e.g., similar to security manager 148) specify user authentication procedures and associated user credentials 160, backup/synchronization configuration, recovery configuration, etc. Keys 158*b* (and key manifest 158*a* based on keys 158*b*) may be static or dynamic, e.g., generated by a key generator (not shown). Security service 150 can store user credentials 160 in secure storage 156. Server(s) 110 provides keys 158*b*, user credentials 160, backup configuration, and recovery configuration to user terminal 106 and/or device 104 for storage, respectively, in secure storage 140 and/or 120, and use in user authentication, secure information backup and recovery operations involving user 102 and/or user terminal 106.

Security service 150 can include, for example, similar to security manager 148, an authentication manager, a backup manager, and a recovery manager. Similar to authentication manager 148*a* in security manager 148, an authentication manager in security service 150 is configured to provide an interface for an administrator of user accessible environment(s) 162 to configure a user authentication procedure and associated user credentials for user 102. An authentication manager is configured to generate an authentication configuration. An authentication manager is an authenticator that performs the authentication procedure based on an authentication configuration.

Similar to backup manager 148*c* in security manager 148, a backup manager in security service 150 is configured to provide an interface for an administrator for user accessible environment(s) 162 to configure a backup/synchronization procedure for secure information stored in secure storage 120 relative to secure information stored in secure storage 156 pertaining to user 102 and user device 104. A backup manager is configured to generate a backup configuration. A backup manager is a synchronizer that performs the backup/synchronization procedure based on the backup configuration.

Similar to recovery manager 148*e* in security manager 148, a recovery manager in security service 150 is configured to provide an interface for an administrator of user accessible environment(s) 162 to configure a recovery procedure using secure information stored in secure storage 120 to recover secure information stored in secure storage 160 pertaining to user 102 and user device 104. A recovery manager is configured to generate a recovery configuration. A recovery manager is a recoverer that performs the recovery procedure based on the recovery configuration.

Security service 150 is configured to communicate with security manager 148 in user terminal 106. Security service 150 and/or security manager 148 can manage user authentication for user 102 and other users to access user accessible environment(s) 146 and/or 162. Security manager 148 is configured to communicate with user device 104. User device 104 can communicate with server(s) 110 indirectly via local communications 164 and network communications 168, 170, and/or directly via network communications 166.

Secure component 152 represents a secure platform module, such as a trusted platform module (TPM). Secure component 152 provides an isolated secure environment not affected by other software (e.g., malware) that may exist on server(s) 110 outside of secure component 152. Secure component 152 includes secure processor 154 and secure storage 156. Secure component 152 includes a secure operating system (OS) (not shown) executed by secure processor 154.

Secure storage 156 includes any data an administrator/user seeks to protect, such as key database 158, user credentials 160, etc. Key database 158 includes key manifest 158*a* and keys 158*b*. Key manifest 158*a* indicates each key among keys 158*b*. Keys 158*b* may be provided to user device 104 as keys 122*b* to use to generate secure token 172 to be transmitted to user terminal 106 in communication 164 and/or to server(s) 110 via network(s) 108 in communication 166. Keys 158*b* include, for example, public keys, private keys, cloud keys, and/or secure shell (SSH) keys. The contents of secure storage 156 may be synchronized to and recovered from secure storage 120.

Secure processor 154 is a tamper-resistant processor that protects secure assets stored in secure storage 156, such as a root of trust, sensitive data, such as user credentials 160, keys **158*b*, key manifest 158*a*, certificates, disc encryption recovery key, applications, etc. against attacks attempting to use software or hardware. Secure processor 154 processes executable code (e.g., programs or applications) to perform operations that access, modify, send, receive, and store data in secure storage 156**.

Secure processor 154 is configured to execute operations to provide a backup configuration (e.g., backup configuration **148*d*) and a recovery configuration (e.g., recovery configuration 148*f*) to user device 104, directly or indirectly via user terminal 106, to store as backup configuration 126 and recovery configuration 128, respectively, to backup/synchronize secure information stored in secure storage 156 with secure information stored in secure storage 120, and to recover secure information stored in secure storage 120. Secure processor 154, for example, receives key manifest 122*a* from user device 104 to determine whether user device 104 is synchronized with user terminal 106 and/or server(s) 110 in terms of secure information stored in secure storage 120 and secure information stored in secure storage 140 and/or secure storage 156. The secure information subject to backup and recovery is fixed or variable based on configuration. For example, a backup configuration (e.g., backup configuration 148*d*) can indicate which information is backed up and conditions for backing up, such as following successful authentication and/or additional user credentials. For example, a recovery configuration (e.g., recovery configuration 148*f*) can indicate which information is recoverable and conditions for recovery, such as user credentials. User credentials 160** include one or more types of credentials, such as biometric, non-biometric, location, non-location, contactless, contact, and so on. For example, user credentials can include user location credential(s), such as three dimensional (3D) position, geo-location, and/or RADAR, and/or non-location credential(s), such as face recognition, voice recognition, gesture(s), movement pattern(s), key(s), and/or time and date.

In an example, server(s) 110 may authenticate user 102 to determine authorization for user 102 to use user device 104 to check a bank balance provided by user terminal 106 or server(s) 110. In an embodiment, user device 104 and user terminal 106 include at least one UWB-enabled device. There may be additional people in the room area with user 102. Security manager 148 can verify which person is which (e.g., center, right, left) and distance from user terminal 106 to determine whether the interaction with user 102 and/or user device 104 providing credentials is secure. For example, user terminal 106 may receive biometric information/user credentials for user 10. Security manager 148 or security service 150 can determine a proximity of user 102, for example, based on UWB communication(s) between user device 104 and user terminal 106. Security manager 148 and/or security service 150 can determine whether user 102 is authenticated based on inferences provided by one or more trained models 126 based on the biometric and proximity information/user credentials provided for authentication/authorization. Other examples can be configured using other user credential information for processing by security manager 148 and/or security service 150.

Figure 2:
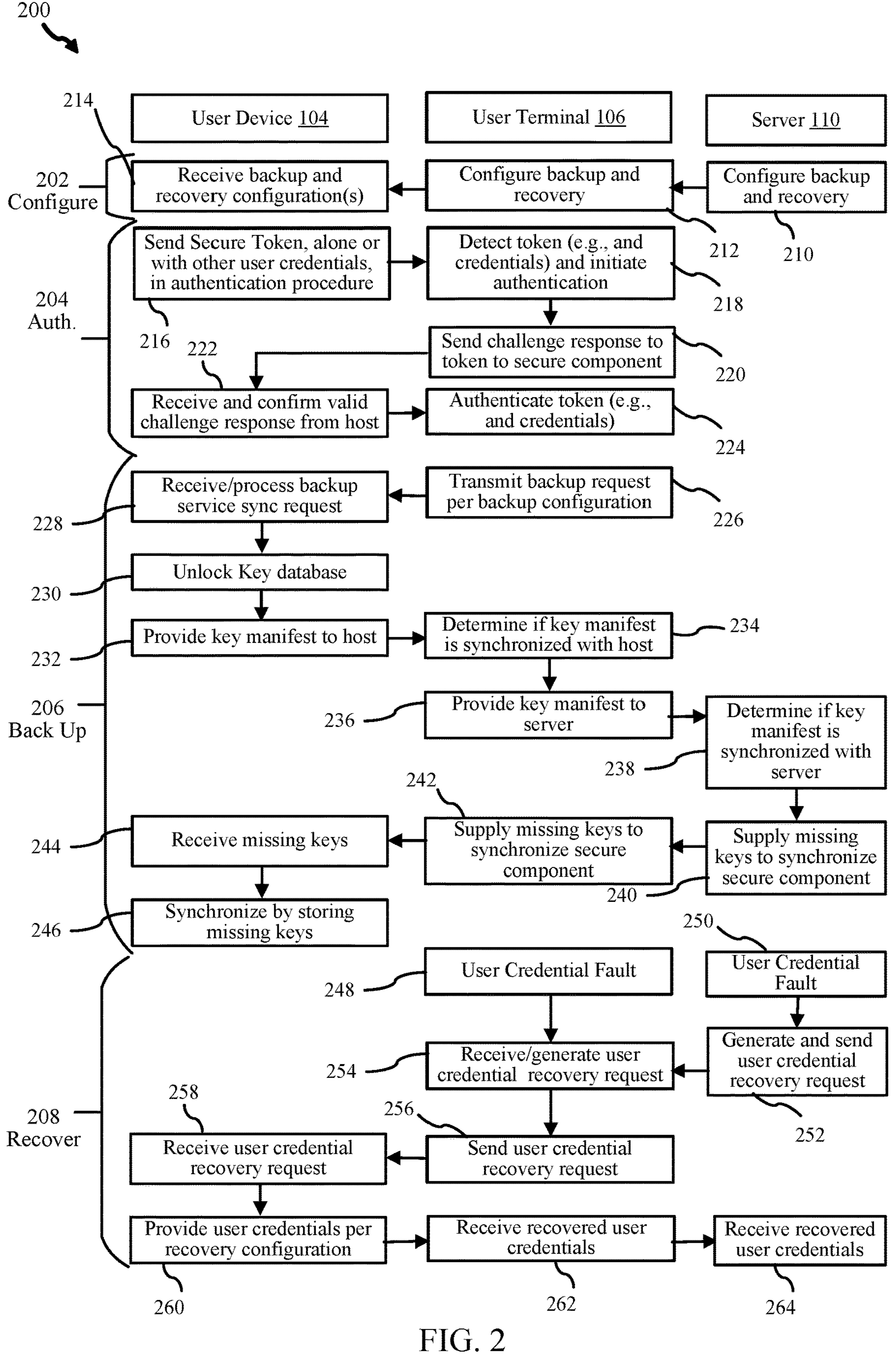
FIG. 2 shows an interaction diagram for an example system configured for non-contact authentication for key recovery and platform security provisioning, in accordance with an embodiment.

For illustrative purposes, further example operation of user device 104, user terminal 106, and server(s) 110, shown in FIG. 1, is described below with respect to FIG. 2. FIG. 2 shows an interaction diagram for an example system configured for non-contact authentication for key recovery and platform security provisioning, in accordance with an embodiment. User device 104, user terminal 106, and server(s) 110 may be configured to operate according to interaction diagram 200 in embodiments. Note that not all steps of interaction diagram 200 need be performed in all embodiments. Further structural and operational embodiments will be apparent to persons skilled in the relevant art(s) based on the following description of FIG. 2.

Interaction diagram 200 shows four phases of interaction, including configuration 202, authentication 204, backup/synchronization 206, and recovery 208. Configuration 202 includes interaction operations 210-214. Authentication 204 includes interaction operations 216-224. Backup/synchronization 206 includes interaction operations 226-246. Recovery 208 includes interaction operations 248-264.

Configuration 202 includes interaction operations 210-214. In operation 210, server 110 configures backup and recovery operations, for example, based on an admin using a user interface. Server 110 may be configured to provide the configuration(s) to user terminal 106 and/or to user device 104.

In operation 212, user terminal configures backup and recovery operations, for example, based on an admin using a user interface. User terminal 106 may be configured to provide the configuration(s) to server(s) 110 and/or to user device 104

In operation 214, user device 104 is configured by receiving backup and recovery configuration(s) from user terminal 106 and/or server 110. User device 104 may receive the configuration(s) directly or indirectly from server 110. The configuration(s) received by user device 104 may be configured and/or provided by user terminal 106 in operation 212 and/or by server 110 in operation 214.

Authentication 204 includes interaction operations 216-224. In operation 216, user device 104 (e.g., coupled to user terminal 106 and/or server(s) 110) sends secure token 172, alone or with other user credentials, during an authentication procedure by user terminal 106 and/or server(s) 110.

In operation 218, user terminal 206 detects the token (e.g., and credentials) and initiates authentication.

In operation 220, user terminal 206 sends a challenge response to the token to the secure component in user device 104.

In operation 222, user device 104 (e.g., and secure component) receives and determines whether the challenge response from the user (host) terminal 106 is valid, providing a confirmation to user terminal 106 if valid.

In operation 224, user terminal 106 authenticates the received token (e.g., and credentials) based on a comparison to known authentication information for user 102 and/or user device 104.

Successful authentication may be a condition (e.g., among multiple conditions, such as expiration of a time period) used by user terminal 106 and/or server(s) 110 to initiate backup/synchronization.

Backup/synchronization 206 includes interaction operations 226-246. In operation 226, user device 104 user terminal 106 transmits a backup request to user device 104 based on the backup configuration. The request could also be generated by server(s) 110.

In operation 228, user device 104 receives and processes the backup service sync request from user terminal 106 and/or server(s) 110.

In operation 230, user device 104 unlocks its key database 122 (e.g., or secure storage 120 generally) to service the backup request.

In operation 232, user device 104 provides key manifest 122*a* (e.g., and/or other secure information in secure storage 120) to user (host) terminal 106.

In operation 234, user terminal 106 determines if the key manifest 122*a* (e.g., and/or other secure information in secure storage 120) provided by user device 104 is synchronized with key manifest 142*a*.

In operation 236, user terminal 106 provides key manifest 122*a* (e.g., and/or other secure information in secure storage 120) to server(s) 110.

In operation 238, server(s) 110 receives key manifest 122*a* (e.g., and/or other secure information in secure storage 120) and determines whether it is synchronized with key manifest 158*a*.

In operation 240, server(s) 110 provides any missing keys (e.g., and/or other secure information in secure storage 120) to user terminal 106 and/or user device 104 to synchronize keys 122*b* (e.g., and/or other secure information in secure storage 120).

In operation 242, user terminal 106 provides any missing keys (e.g., and/or other secure information in secure storage 120) to user terminal 106 and/or user device 104 to synchronize keys 122*b* (e.g., and/or other secure information in secure storage 120).

In operation 244, user device 104 receives any missing keys (e.g., and/or other secure information in secure storage 120) from user terminal 106 and/or server(s) 110 to synchronize keys 122*b* (e.g., and/or other secure information in secure storage 120).

In operation 246, user device synchronizes secure storage 120 with secure storage 140 and/or secure storage 156 by storing in secure storage 120 received missing keys (e.g., and/or other secure information in secure storage 120) received from user terminal 106 and/or server(s) 110.

Recovery 208 includes interaction operations 248-264. In operation 248, user terminal 106 generates a user credential (e.g., and/or other secure information) fault.

In operation 250, server(s) 110 generates a user credential (e.g., and/or other secure information) fault.

In operation 252, server(s) 110 generate (e.g., and send) a user credential (e.g., and/or other secure information in secure storage 120) recovery request, which may proceed directly to user device 104 or indirectly to user device 104 through user terminal 106.

In operation 254, user terminal 106 generates a user credential (e.g., and/or other secure information in secure storage 120) recovery request based on the fault it generated and/or based on the fault received from server(s) 110.

In step 256, user terminal 206 sends the user credential recovery request to user device 104.

In operation 258, user device 104 receives the user credential (e.g., and/or other secure information in secure storage 120) recovery request.

In operation 260, user device provides user credentials 124 (e.g., and/or other secure information in secure storage 120) to user terminal 106 (e.g., or directly to server(s) 110).

In operation 262, user terminal 106 receives the user credentials 124 (e.g., and/or other secure information in secure storage 120) recovered from user device 104.

In operation 264, server(s) 110 receive the user credentials 124 (e.g., and/or other secure information in secure storage 120) recovered from user device 104.

Figure 3:
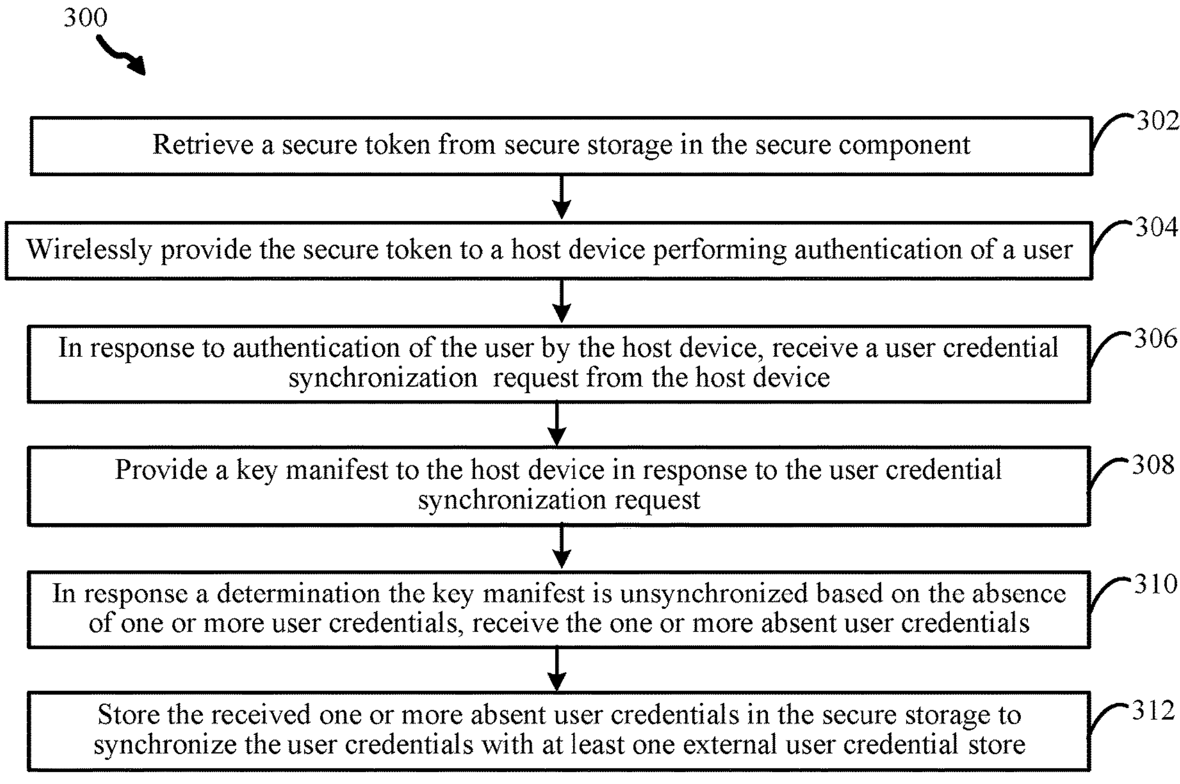
FIG. 3 shows a flowchart of a process for implementing non-contact authentication for key recovery and platform security provisioning in a user device, in accordance with an embodiment.

For illustrative purposes, further example operation of user device 104, user terminal 106, and server(s) 110, shown in FIG. 1, is described below with respect to FIG. 3. FIG. 3 shows a flowchart 300 of a process for implementing non-contact authentication for key recovery and platform security provisioning in a user device, in accordance with an embodiment. User device 104, user terminal 106, and server(s) 110 may be configured to operate according to flowchart 300 in embodiments. Note that not all steps of flowchart 300 need be performed in all embodiments. Further structural and operational embodiments will be apparent to persons skilled in the relevant art(s) based on the following description of FIG. 3.

Flowchart 300 shows an example of operations from the perspective of user device 104. In operation 302, a secure token may be retrieved from (e.g., or generated based on) secure information in secure storage in the secure component. For example, as shown in FIG. 1, secure processor 118 executes instructions to generate secure token 172 based on one or more keys 122*b* and at least one user credential 124 (e.g., password).

In operation 304, the secure token is wirelessly provided to a host device performing authentication of a user. For example, as shown in FIG. 1, secure processor 118 uses transceiver(s) 114 to wirelessly transmit the secure token 172 to user terminal 106 during authentication 204.

In operation 306, in response to the user being authenticated by the host device, a user credential synchronization request is received from the host device. For example, as shown in FIG. 1, transceiver(s) 114 receives a user credential synchronization request from user terminal 106 if host device 106 authenticated user 102.

In operation 308, a key manifest is provided to the host device in response to the user credential synchronization request. For example, as shown in FIG. 1, in response to receiving a request for synchronization, secure processor 118 accesses key manifest 122*a* and uses transceiver(s) 114 to wirelessly transmit key manifest 122*a* to user terminal 106.

In operation 310, in response to a determination the key manifest is unsynchronized based on the absence of one or more user credentials, the one or more absent user credentials are received. For example, as shown in FIG. 1, user device 104 will receive one or more keys from user terminal 106 and/or server(s) 110 if user terminal 106 and/or server(s) 110 determine that key manifest 122*a* is missing any keys present in key manifest 142*a* and/or key manifest 158*a*.

In operation 312, the received one or more absent user credentials are stored in the secure storage to synchronize the user credentials with at least one external user credential store. For example, as shown in FIG. 1, in response to receiving one or more missing keys, secure processor 118 stores the received keys with keys 122*b* and updates key manifest 122*a* to complete the synchronization operation.

Figure 4:
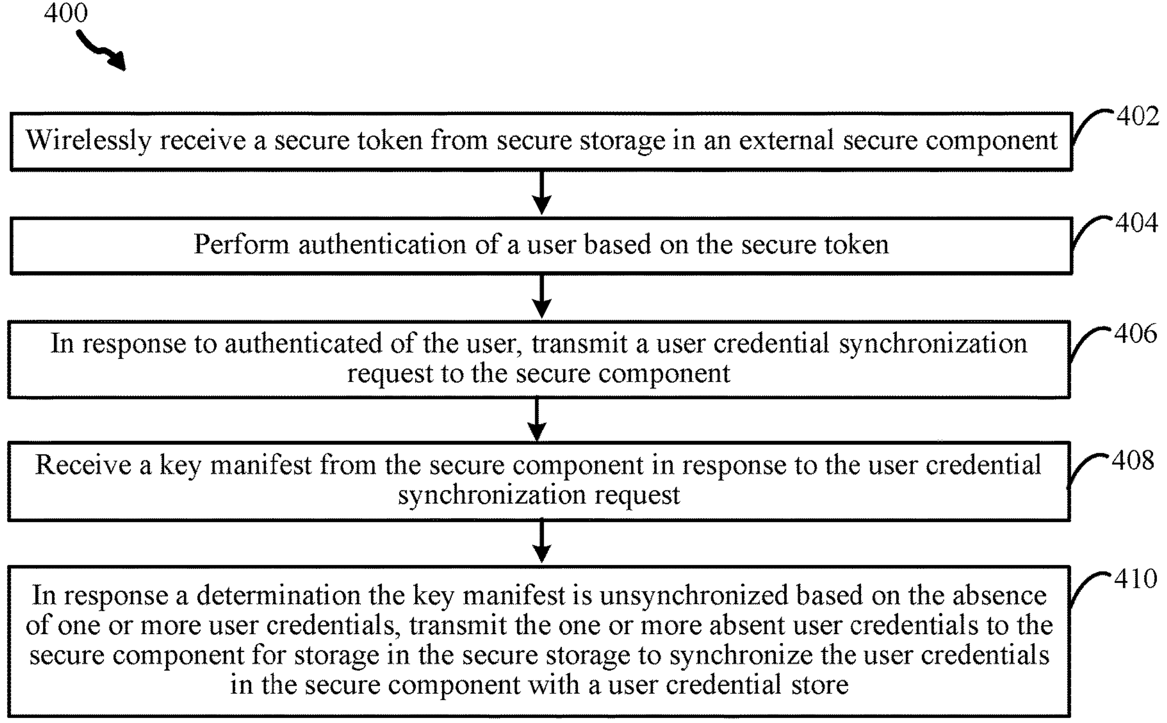
FIG. 4 shows a flowchart of a process for implementing non-contact authentication for key recovery and platform security provisioning in a host device, in accordance with embodiments.

For illustrative purposes, further example operation of user device 104, user terminal 106, and server(s) 110, shown in FIG. 1, is described below with respect to FIG. 4. FIG. 4 shows a flowchart 400 of a process for implementing non-contact authentication for key recovery and platform security provisioning in a host device, in accordance with embodiments. User device 104, user terminal 106, and server(s) 110 may be configured to operate according to flowchart 400 in embodiments. Note that not all steps of flowchart 400 need be performed in all embodiments. Further structural and operational embodiments will be apparent to persons skilled in the relevant art(s) based on the following description of FIG. 4.

Flowchart 400 shows an example of operations from the perspective of user terminal 106. In operation 402, a secure token is wirelessly received from secure storage in an external secure component. For example, as shown in FIG. 1, user terminal 106 receives secure token 172 transmitted by user device 104 during authentication 204.

In operation 404, authentication of a user is performed based on the secure token. For example, as shown in FIG. 1, security manager 148 in user terminal 106 performs user authentication for user 102 based on the received secure token 172.

In operation 406, in response to the user being authenticated, a user credential synchronization request is transmitted to the secure component. For example, as shown in FIG. 1, if security manager 148 authenticates user 102, security manager 148 (e.g., backup manager 148*c*) will, based on the authentication, cause transceiver(s) 134 to transmit a user credential synchronization request to user device 104 during a backup operation 206.

In operation 408, a key manifest is received from the secure component in response to the user credential synchronization request. For example, as shown in FIG. 1, user terminal 106 receives key manifest 122*a* in a transmission from transceiver(s) 114 in user device 104.

In operation 410, in response a determination the key manifest is unsynchronized based on the absence of one or more user credentials, transmit the one or more absent user credentials to the secure component for storage in the secure storage to synchronize the user credentials in the secure component with a user credential store. For example, as shown in FIG. 1, backup manager 148*c* in security manager 148 will compare received key manifest 122*a* to key manifest 142*a* to determine whether user device 104 is synchronized. If user device is determined to be unsynchronized, backup manager 148*c* will cause transceiver(s) 134 to transmit any missing keys to user device 104 to store with keys 122*b* to complete synchronization of user device 104.

For illustrative purposes, further example operation of user device 104, user terminal 106, and server(s) 110, shown in FIG. 1, is described below with respect to FIG. 5. FIG. 5 shows a flowchart 500 of a process for implementing non-contact authentication for key recovery and platform security provisioning in a server, in accordance with an embodiment. User device 104, user terminal 106, and server (s) 110 may be configured to operate according to flowchart 500 in embodiments. Note that not all steps of flowchart 500 need be performed in all embodiments. Further structural and operational embodiments will be apparent to persons skilled in the relevant art(s) based on the following description of FIG. 5.

Flowchart 500 shows an example of operations from the perspective of user server(s) 110. In operation 502, a user credential synchronization request comprising a key manifest for a secure component is received from a host device in response to a user credential synchronization request provided by the host device to the secure component following authentication of a secure token received by the host device from the secure component. For example, as shown in FIG. 1, following authentication of user 102, user terminal 106 sends a synchronization request to user device 104, which responds by providing key manifest 122*a* from secure component 116 to user terminal 106. Server(s) 110 receive key manifest 122*a* from user terminal 106.

In operation 504, a determination is made whether the key manifest provided by the secure component is synchronized with user credentials in a user credential store managed by the server. For example, as shown in FIG. 1, security service 150 will compare received key manifest 122*a* to key manifest 158*a* in secure component 152 to determine whether user device 104 is synchronized.

In operation 506, if the key manifest is determined to be unsynchronized based on the absence of one or more user credentials, the one or more absent user credentials are transmitted to the host device for transmission to the secure component to synchronize the user credentials in the secure component with the user credential store managed by the server. For example, as shown in FIG. 1, if security service 150 determines that user device 104 is unsynchronized, security service 150 will cause transceiver(s) in server(s) 110 to transmit any missing keys to user device 104 via user terminal 106 through network(s) 108 for device 104 to store with keys 122*b* to complete synchronization of user device 104.

III. Example Computing Device Embodiments

User device 104, user terminal 106, server(s) 110, secure component 116, secure processor 118, secure storage 120, key database 122, key manifest 122*a*, keys 122*b*, user credentials 124, backup configuration 126, recovery configuration 128, secure component 136, secure processor 138, secure storage 140, key database 142, key manifest 142*a*, keys 142*b*, user credentials 144, security manager 148, authentication manager 148*a*, authentication configuration 148*b*, backup manager 148*c*, backup configuration 148*d*, recovery manager 148*e*, recovery configuration 148*f*, security service 150, secure component 152, secure processor 154, secure storage 156, key database 158, key manifest 158*a*, keys 158*b*, user credentials 160, interaction diagram 200, flowchart 300, flowchart 400, and flowchart 500, are implemented in hardware, or hardware combined with one or both of software and/or firmware. For example, user device 104, user terminal 106, server(s) 110, secure component 116, secure processor 118, secure storage 120, key database 122, key manifest 122*a*, keys 122*b*, user credentials 124, backup configuration 126, recovery configuration 128, secure component 136, secure processor 138, secure storage 140, key database 142, key manifest 142*a*, keys 142*b*, user credentials 144, security manager 148, authentication manager 148*a*, authentication configuration 148*b*, backup manager 148*c*, backup configuration 148*d*, recovery manager 148*e*, recovery configuration 148*f*, security service 150, secure component 152, secure processor 154, secure storage 156, key database 158, key manifest 158*a*, keys 158*b*, user credentials 160, interaction diagram 200, flowchart 300, flowchart 400, and flowchart 500 are each implemented as computer program code/instructions configured to be executed in one or more processors and stored in a computer readable storage medium. Alternatively, user device 104, user terminal 106, server(s) 110, secure component 116, secure processor 118, secure storage 120, key database 122, key manifest 122*a*, keys 122*b*, user credentials 124, backup configuration 126, recovery configuration 128, secure component 136, secure processor 138, secure storage 140, key database 142, key manifest 142*a*, keys 142*b*, user credentials 144, security manager 148, authentication manager 148*a*, authentication configuration 148*b*, backup manager 148*c*, backup configuration 148*d*, recovery manager 148*e*, recovery configuration 148*f*, security service 150, secure component 152, secure processor 154, secure storage 156, key database 158, key manifest 158*a*, keys 158*b*, user credentials 160, interaction diagram 200, flowchart 300, flowchart 400, and flowchart 500 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 6. FIG. 6 shows a block diagram of an exemplary computing environment 600 that includes a computing device 602. Computing device 602 is an example of each of user device 104, user terminal 106 and server 110, which may each include one or more of the components of computing device 602. In some embodiments, computing device 602 is communicatively coupled with devices (not shown in FIG. 6) external to computing environment 600 via network 604. Network 604 comprises one or more networks such as local area networks (LANs), wide area networks (WANs), enterprise networks, the Internet, etc. In examples, network 604 includes one or more wired and/or wireless portions. In some examples, network 604 additionally or alternatively includes a cellular network for cellular communications. Computing device 602 is described in detail as follows.

Computing device 602 is any of a variety of types of computing devices. Examples of computing device 602 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 602 is a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, a graphics processing unit (GPU) 642, a neural processing unit (NPU) 644, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 688. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and in a particular embodiment any combination of the components are present. In examples, components of computing device 602 are mounted to a circuit card (e.g., a motherboard) of computing device 602, integrated in a housing of computing device 602, or otherwise included in computing device 602. The components of computing device 602 are described as follows.

In embodiments, a single processor 610 (e.g., central processing unit (CPU), microcontroller, a microprocessor, signal processor, ASIC (application specific integrated circuit), and/or other physical hardware processor circuit) or multiple processors 610 are present in computing device 602 for performing such tasks as program execution, signal coding, data processing, input/output processing, power control, and/or other functions. In examples, processor 610 is a single-core or multi-core processor, and each processor core is single-threaded or multithreaded (to provide multiple threads of execution concurrently). Processor 610 is configured to execute program code stored in a computer readable medium, such as program code of operating system 612 and application programs 614 stored in storage 620. The program code is structured to cause processor 610 to perform operations, including the processes/methods disclosed herein. Operating system 612 controls the allocation and usage of the components of computing device 602 and provides support for one or more application programs 614 (also referred to as "applications" or "apps"). In examples, application programs 614 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 610 includes one or more general processors (e.g., CPUs) configured with or coupled to one or more hardware accelerators, such as one or more NPUs 644 and/or one or more GPUs 642.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) present to communicatively couple processor 610 to various other components of computing device 602, although in other embodiments, an alternative bus, further buses, and/or one or more individual signal lines is/are present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 688, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 622 includes main memory and is separate from or fabricated in a same integrated circuit as processor 610. As shown in FIG. 6, non-removable memory 622 stores firmware 618 that is present to provide low-level control of hardware. Examples of firmware 618 include BIOS (Basic Input/Output System, such as on personal computers) and boot firmware (e.g., on smart phones). In examples, removable memory 624 is inserted into a receptacle of or is otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 688 are present that are internal and/or external to a housing of computing device 602 and are or are not removable. Examples of storage device 688 include a hard disk drive, a SSD, a thumb drive (e.g., a USB (Universal Serial Bus) flash drive), or other physical storage device.

One or more programs are stored in storage 620. Such programs include operating system 612, one or more application programs 614, and other program modules and program data. Examples of such application programs include computer program logic (e.g., computer program code/instructions) for implementing user device 104, user terminal 106, server(s) 110, secure component 116, secure processor 118, secure storage 120, key database 122, key manifest **122*a*, keys 122*b*, user credentials 124, backup configuration 126, recovery configuration 128, secure component 136, secure processor 138, secure storage 140, key database 142, key manifest 142*a*, keys 142*b*, user credentials 144, security manager 148, authentication manager 148*a*, authentication configuration 148*b*, backup manager 148*c*, backup configuration 148*d*, recovery manager 148*e*, recovery configuration 148*f*, security service 150, secure component 152, secure processor 154, secure storage 156, key database 158, key manifest 158*a*, keys 158*b*, user credentials 160, interaction diagram 200, flowchart 300, flowchart 400, and flowchart 500**, and/or any individual steps thereof.

Storage 620 also stores data used and/or generated by operating system 612 and application programs 614 as application data 616. Examples of application data 616 include web pages, text, images, tables, sound files, video data, and other data. In examples, application data 616 is sent to and/or received from one or more network servers or other devices via one or more wired or wireless networks. Storage 620 is used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 602 through one or more input devices 630 and receives information from computing device 602 through one or more output devices 650. Input device(s) 630 includes one or more of touch screen 632, microphone 634, camera 636, physical keyboard 638 and/or trackball 640 and output device(s) 650 includes one or more of speaker 652 and display 654. Each of input device(s) 630 and output device(s) 650 are integral to computing device 602 (e.g., built into a housing of computing device 602) or are external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 displays information, as well as operating as touch screen 632 by receiving user commands and/or other information (e.g., by touch, finger gestures, virtual keyboard, etc.) as a user interface. Any number of each type of input device(s) 630 and output device(s) 650 are present, including multiple microphones 634, multiple cameras 636, multiple speakers 652, and/or multiple displays 654.

In embodiments where GPU 642 is present, GPU 642 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 642 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 644 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 628. In an example, NPU 644 is configured for a data-driven parallel computing and is highly efficient at processing massive multimedia data such as videos and images and processing data for neural networks. NPU 644 is configured for efficient handling of AI-related tasks, such as speech recognition, background blurring in video calls, photo or video editing processes like object detection, etc.

In embodiments disclosed herein that implement ML models, NPU 644 can be utilized to execute such ML models, of which MLM 628 is an example. For instance, where applicable, MLM 628 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 644 is used to train MLM 628. To train MLM 628, training data is that includes input features (attributes) and their corresponding output labels/target values (e.g., for supervised learning) is collected. A training algorithm is a computational procedure that is used so that MLM 628 learns from the training data. Examples of training inputs for ML model training include user position, angle, gesture, time of day, location, user crypto, etc. Parameters/weights are internal settings of MLM 628 that are adjusted during training by the training algorithm to reduce a difference between predictions by MLM 628 and actual outcomes (e.g., output labels). In some examples, MLM 628 is set with initial values for the parameters/weights. A loss function measures a dissimilarity between predictions by MLM 628 and the target values, and the parameters/weights of MLM 628 are adjusted to minimize the loss function. The parameters/weights are iteratively adjusted by an optimization technique, such as gradient descent. In this manner, MLM 628 is generated through training by NPU 644 to be used to generate inferences based on received input feature sets for particular applications. MLM 628 is generated as a computer program or other type of algorithm configured to generate an output (e.g., a classification, a prediction/inference) based on received input features and is stored in the form of a file or other data structure.

In examples, such training of MLM 628 by NPU 644 is supervised or unsupervised. According to supervised learning, input objects (e.g., a vector of predictor variables) and a desired output value (e.g., a human-labeled supervisory signal) train MLM 628. The training data is processed, building a function that maps new data on expected output values. Example algorithms usable by NPU 644 to perform supervised training of MLM 628 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 628 is an LLM, MLM 628 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 628 is trained to learn patterns from unlabeled data. For instance, in embodiments where MLM 628 implements unsupervised learning techniques, MLM 628 identifies one or more classifications or clusters to which an input belongs. During a training phase of MLM 628 according to unsupervised learning, MLM 628 tries to mimic the provided training data and uses the error in its mimicked output to correct itself (i.e., correct weights and biases). In further examples, NPU 644 perform unsupervised training of MLM 628 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 644 need not necessarily be present in all ML model embodiments. In embodiments where ML models are present, any one or more of processor 610, GPU 642, and/or NPU 644 can be present to train and/or execute MLM 628.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). In examples, wireless modem 660 also or alternatively includes other radio-based modem types, such as a Bluetooth modem 664 (also referred to as a "Bluetooth device") and/or Wi-Fi modem 662 (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and receives power from a battery internal to computing device 602, and/or from a power cord plugged into a power port of computing device 602 (e.g., a USB port, an A/C power port). LI receiver 684 is useable for location determination of computing device 602 and in examples includes a satellite navigation receiver such as a Global Positioning System (GPS) receiver and/or includes other type of location determiner configured to determine location of computing device 602 based on received information (e.g., using cell tower triangulation, etc.). Accelerometer 686, when present, is configured to determine an orientation of computing device 602.

Note that the illustrated components of computing device 602 are not required or all-inclusive, and fewer or greater numbers of components can be present as would be recognized by one skilled in the art. In examples, computing device 602 includes one or more of a gyroscope, barometer, proximity sensor, ambient light sensor, digital compass, etc. In an example, processor 610 and memory 656 are co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein is stored in storage 620 and executed by processor 610.

In some embodiments, server infrastructure 670 is present in computing environment 600 and is communicatively coupled with computing device 602 via network 604. Server infrastructure 670, when present, is a network-accessible server set (e.g., a cloud-based environment or platform). As shown in FIG. 6, server infrastructure 670 includes clusters 672. Each of clusters 672 comprises a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. In examples, any of nodes 674 is a storage node that comprises a plurality of physical storage disks, SSDs, and/or other physical storage devices that are accessible via network 604 and are configured to store data associated with the applications and services managed by nodes 674.

Each of nodes 674, as a compute node, comprises one or more server computers, server systems, and/or computing devices. For instance, a node 674 in accordance with an embodiment includes one or more of the components of computing device 602 disclosed herein. Each of nodes 674 is configured to execute one or more software applications (or "applications") and/or services and/or manage hardware resources (e.g., processors, memory, etc.), which are utilized by users (e.g., customers) of the network-accessible server set. In examples, as shown in FIG. 6, nodes 674 includes a node 646 that includes storage 648 and/or one or more of a processor 658 (e.g., similar to processor 610, GPU 642, and/or NPU 644 of computing device 602). Storage 648 stores application programs 676 and application data 678. Processor(s) 658 operate application programs 676 which access and/or generate related application data 678. In an implementation, nodes such as node 646 of nodes 674 operate or comprise one or more virtual machines, with each virtual machine emulating a system architecture (e.g., an operating system), in an isolated manner, upon which applications such as application programs 676 are executed.

In embodiments, one or more of clusters 672 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 672 are included in a datacenter in a distributed collection of datacenters. In embodiments, exemplary computing environment 600 comprises part of a cloud-based platform.

In an embodiment, computing device 602 accesses application programs 676 for execution in any manner, such as by a client application and/or a browser at computing device 602.

In an example, for purposes of network (e.g., cloud) backup and data security, computing device 602 additionally and/or alternatively synchronizes copies of application programs 614 and/or application data 616 to be stored at network-based server infrastructure 670 as application programs 676 and/or application data 678. In examples, operating system 612 and/or application programs 614 include a file hosting service client configured to synchronize applications and/or data stored in storage 620 at network-based server infrastructure 670.

In some embodiments, on-premises servers 692 are present in computing environment 600 and are communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 can be shared by on-premises servers 692 between computing devices of the organization, including computing device 602 (when part of an organization) through a local network of the organization, and/or through further networks accessible to the organization (including the Internet). Furthermore, in examples, on-premises servers 692 serve applications such as application programs 696 to the computing devices of the organization, including computing device 602. Accordingly, in examples, on-premises servers 692 include storage 694 (which includes one or more physical storage devices such as storage disks and/or SSDs) for storage of application programs 696 and application data 698 and include a processor 690 (e.g., similar to processor 610, GPU 642, and/or NPU 644 of computing device 602) for execution of application programs 696. In some embodiments, multiple processors 690 are present for execution of application programs 696 and/or for other purposes. In further examples, computing device 602 is configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 is used to implement systems, clients, or devices, or components/subcomponents thereof, disclosed elsewhere herein. In other embodiments, a combination of computing device 602, network-based server infrastructure 670, and/or on-premises servers 692 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 620. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 614) are stored in storage 620. Such computer programs can also be received via wired interface(s) 660 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

VI. Additional Example Embodiments

Systems, methods, and instrumentalities are described herein related to non-contact authentication for key recovery and platform security provisioning. Access credentials are backed up to and recovered from a user device, such as a smart card, utilized as a secondary root of trust. Automatic, secure backup and storage of user authentication keys, user credentials, crypto tokens, disc encryption recovery key keys, etc. occurs wirelessly onto one or more personal accessories, such as a secure NFC card or a mobile embedded secure component. For example, NFC enabled devices can auto-save secure information in secure storage vaults that are already part of the NFC subsystem when they successfully 'tap to' authenticate to access a host computing system. Access to store and retrieve can be further enhanced with geo location presence detection, e.g., using UWB. Credentials can be recovered from secure storage in a user device via a wireless interface, such as NFC or UWB.

A secure information backup/synchronization and recovery service provides an interface for an administrator/user to specify a backup procedure (e.g., indicating what secure key/credential information to backup, when, where, and how) and a recovery procedure to access the backed up information. Information to be backed up to secure storage in a user device may be configured, such as trusted platform module (TPM), disc encryption recovery key, file encryption, and/or account credentials. A user can authenticate during a recovery procedure to retrieve keys backed up on a user device via any configured method, such as password, geofence, third party, etc. Automated backup/synchronization is triggered by one or more configured conditions, such as successful authentication, resulting in automated backup of all configured secure access credentials to one or more designated destinations (e.g., one or more secure user devices or other secure locations). Credential backup synchronization to a user device may be triggered periodically or aperiodically, for example, by successful user authentication during a login procedure. For example, when a user logs in to a host device with an NFC-enabled smart card (SC), designated keys (e.g., disc encryption recovery key) are backed up into a secure component (SE) in the NFC-enabled SC and/or one or more other secure locations indicated to the service.

In one aspect, a method of non-contact authentication for key recovery and platform security provisioning, implemented by a user device, comprises: retrieving a secure token from secure storage in the secure component; wirelessly providing the secure token to a host device performing authentication of a user; in response to authentication of the user by the host device, receiving a user credential synchronization request from the host device; providing a key manifest to the host device in response to the user credential synchronization request; in response a determination the key manifest is unsynchronized based on the absence of one or more user credentials, receiving the one or more absent user credentials; and storing the received one or more absent user credentials in the secure storage to synchronize the user credentials with at least one external user credential store.

According to another aspect, a method of non-contact authentication for key recovery and platform security provisioning, implemented by a host device, comprises: wirelessly receiving a secure token from secure storage in an external secure component; performing authentication of the user based on the secure token; in response to authentication of the user, transmitting a user credential synchronization request to the secure component; receiving a key manifest from the secure component in response to the user credential synchronization request; in response a determination the key manifest is unsynchronized based on the absence of one or more user credentials, transmitting the one or more absent user credentials to the secure component for storage in the secure storage to synchronize the user credentials in the secure component with a user credential store.

According to still another aspect, a method of non-contact authentication for key recovery and platform security provisioning, implemented by a server, comprises: receiving a user credential synchronization request comprising a key manifest for a secure component from a host device in response to a user credential synchronization request provided by the host device to the secure component following authentication of a secure token received by the host device from the secure component; determining whether the key manifest provided by the secure component is synchronized with user credentials in a user credential store managed by the server; and in response a determination the key manifest is unsynchronized based on the absence of one or more user credentials, transmitting the one or more absent user credentials to the host device for transmission to the secure component to synchronize the user credentials in the secure component with the user credential store managed by the server.

In examples, a method may be implemented in at least one computing device. The method may comprise, for example, as described herein.

As described herein by example, a method of performing non-contact authentication for key recovery and platform security provisioning executed by a secure component (e.g., smart card, cell phone), comprises retrieving a secure token from secure storage in the secure component; wirelessly providing the secure token to a host device performing authentication of a user; in response to the user being authenticated by the host device, receiving a user credential synchronization request from the host device; providing a key manifest to the host device in response to the user credential synchronization request; in response a determination the key manifest is unsynchronized based on the absence of one or more user credentials, receiving the one or more absent user credentials; and storing the received one or more absent user credentials in the secure storage to synchronize the user credentials with at least one external user credential store.

In examples, the secure component comprises a smart card.

In examples, the method further comprises providing an additional user credential to the host device performing the user authentication.

In examples, the one or more absent user credentials is determined by the host device. For instance, the absent user credential(s) may be stored at the host device, and thus determined by the host device without resorting to communicating with other devices.

In examples, the one or more absent user credentials is determined by a server and indicated to the host device. For instance, the absent user credential(s) may be stored by or accessible to a server, such as due to the absent user credential(s) being stored/synchronized to a cloud server/storage network for safe keeping. The server may retrieve the absent user credential(s) and provide them to the host device.

In examples, the secure token is provided to the host device by the secure component using near field communication (NFC) or ultra-wideband (UWB) communication.

In examples, the method further comprises receiving a request for user credential recovery; and participating in/providing/supporting/performing a user credential recovery by recovering user credentials from the secure storage according to a user credential recovery configuration.

In examples, the method further comprises receiving the user credential recovery configuration; and indicating multi-factor authentication information for recovery of user credentials. For example, stored keys in the secure storage may be retrieved by authenticating via one or more (e.g., a combination of) methods, such as a (e.g., master) password, a geofence (e.g., geo location presence detection), a third party account, or a third party with an NFC-enabled secure component. In this manner, the stored keys may be more securely stored in the secure storage, and the more stringent authentication of multi-factor authentication may be used to reduce the likelihood of unauthorized users being able to access the stored keys.

As described herein by example, a method of performing non-contact authentication for key recovery and platform security provisioning executed by a host device, comprises wirelessly receiving a secure token from secure storage in an external secure component; performing authentication of a user based on the secure token; in response to the user being authenticated, transmitting a user credential synchronization (e.g., backup) request to the secure component; receiving a key manifest from the secure component in response to the user credential synchronization request; and in response a determination the key manifest is unsynchronized based on the absence of one or more user credentials, transmitting the one or more absent user credentials to the secure component for storage in the secure storage to synchronize the user credentials in the secure component with a user credential store.

In examples, the secure component comprises a smart card.

In examples, the method further comprises receiving an additional user credential for the user authentication.

In examples, the user credential store is managed by at least one of the host device or a server.

In examples, the host device receives the secure token and/or the one or more absent user credentials from the secure component using near field communication (NFC) or ultra-wideband (UWB) communication.

In examples, the method further comprises transmitting a request for user credential recovery to the secure component; and participating in a user credential recovery by recovering user credentials from the secure storage according to a user credential recovery configuration.

In examples, the method further comprises transmitting the user credential recovery configuration to the secure component, wherein the user credential recovery configuration indicates multi-factor authentication information for recovery of user credentials, which may include, for example, retrieving stored keys in the secure storage by authenticating via one or more (e.g., a combination of) approved methods, such as a (e.g., master) password, a geofence (e.g., geo location presence detection), a third party account or a third party with an NFC-enabled secure component.

In examples, the method further comprises transmitting a user credential synchronization configuration to the secure component for responding to the user credential synchronization. In examples, the user credential synchronization configuration indicates what information is synchronized, synchronization conditions (e.g., frequency of update), and synchronization security user credentials (e.g., geolocation, verification of users' identity, such as by UWB).

As described herein by example, a method of performing non-contact authentication for key recovery and platform security provisioning executed by a server, comprises receiving a user credential synchronization request comprising a key manifest for a secure component from a host device in response to a user credential synchronization request provided by the host device to the secure component following authentication of a secure token received by the host device from the secure component; determining whether the key manifest provided by the secure component is synchronized with user credentials in a user credential store managed by the server; and in response a determination the key manifest is unsynchronized based on the absence of one or more user credentials, transmitting the one or more absent user credentials to the host device for transmission to the secure component to synchronize the user credentials in the secure component with the user credential store managed by the server.

In examples, the method further comprises transmitting a request for user credential recovery to the host device; and participating in a user credential recovery by recovering user credentials from the secure component according to a user credential recovery configuration.

In examples, the method further comprises transmitting the user credential recovery configuration to the host device for transmission to the secure component. In examples, the user credential recovery configuration indicates multi-factor authentication information for recovery of keys in the secure storage.

In examples, the method further comprises transmitting a user credential synchronization configuration to the host device for transmission to the secure component for responding to the user credential synchronization. The user credential synchronization configuration indicates what information is synchronized, synchronization conditions (e.g., frequency of update), and synchronization security (e.g., geolocation, verification of users' identity, such as by UWB).

In examples, a computing device and computing system are described herein. A computing device or a computing system may implement any process or method as described herein.

In examples, a computer-readable storage medium is described herein. The computer-readable storage medium has program instructions recorded thereon that, when executed by a processor, implements a method, such as any method described herein.

VII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

For example, running examples have been described with respect to malicious activity detectors determining whether compute resource creation operations potentially correspond to malicious activity. However, it is also contemplated herein that malicious activity detectors may be used to determine whether other types of control plane operations potentially correspond to malicious activity.

Several types of impactful operations have been described herein; however, lists of impactful operations may include other operations, such as, but not limited to, accessing enablement operations, creating and/or activating new (or previously-used) user accounts, creating and/or activating new subscriptions, changing attributes of a user or user group, changing multi-factor authentication settings, modifying federation settings, changing data protection (e.g., encryption) settings, elevating another user account's privileges (e.g., via an admin account), retriggering guest invitation e-mails, and/or other operations that impact the cloud-base system, an application associated with the cloud-based system, and/or a user (e.g., a user account) associated with the cloud-based system.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A method executed by a secure component, comprising:

retrieving a secure token from secure storage in the secure component;

wirelessly providing the secure token to a host device performing authentication of a user;

in response to authentication of the user by the host device, receiving a user credential synchronization request from the host device;

providing a key manifest to the host device in response to the user credential synchronization request;

in response to a determination the key manifest is unsynchronized based on the absence of one or more user credentials, receiving the one or more absent user credentials; and storing the received one or more absent user credentials in the secure storage to synchronize the user credentials with at least one external user credential store.

2. The method of claim 1, wherein the secure component comprises a smart card.

3. The method of claim 1, further comprising:

providing an additional user credential to the host device performing the user authentication.

4. The method of claim 1, wherein the one or more absent user credentials is determined by the host device.

5. The method of claim 1, wherein the one or more absent user credentials is determined by a server and indicated to the host device.

6. The method of claim 1, wherein the secure token is provided to the host device by the secure component using near field communication (NFC) or ultra-wideband (UWB) communication.

7. The method of claim 1, further comprising:

receiving a request for user credential recovery; and participating in the user credential recovery by recovering user credentials from the secure storage according to a user credential recovery configuration.

8. The method of claim 7, further comprising:

receiving the user credential recovery configuration; and indicating multi-factor authentication information for recovery of user credentials.

9. A method executed by a host device, comprising:

wirelessly receiving a secure token from secure storage in an external secure component;

performing authentication of a user based on the secure token;

in response to authentication of the user, transmitting a user credential synchronization request to the secure component;

receiving a key manifest from the secure component in response to the user credential synchronization request; and in response to a determination the key manifest is unsynchronized based on the absence of one or more user credentials, transmitting the one or more absent user credentials to the secure component for storage in the secure storage to synchronize the user credentials in the secure component with a user credential store.

10. The method of claim 9, wherein the secure component comprises a smart card.

11. The method of claim 9, further comprising:

receiving an additional user credential for the user authentication.

12. The method of claim 9, wherein the user credential store is managed by at least one of the host device or a server.

13. The method of claim 9, wherein the host device receives the secure token from the secure component using near field communication (NFC) or ultra-wideband (UWB) communication.

14. The method of claim 9, further comprising:

transmitting a request for user credential recovery to the secure component; and participating in a user credential recovery by recovering user credentials from the secure storage according to a user credential recovery configuration.

15. The method of claim 14, further comprising:

transmitting the user credential recovery configuration to the secure component, wherein the user credential recovery configuration indicates multi-factor authentication information for recovery of user credentials.

16. The method of claim 15, further comprising:

transmitting a user credential synchronization configuration to the secure component for responding to the user credential synchronization, wherein the user credential synchronization configuration indicates what information is synchronized, synchronization conditions, and synchronization security.

17. A method executed by a server, comprising:

receiving a user credential synchronization request comprising a key manifest for a secure component from a host device in response to a user credential synchronization request provided by the host device to the secure component following authentication of a secure token received by the host device from the secure component;

determining whether the key manifest provided by the secure component is synchronized with user credentials in a user credential store managed by the server; and in response to a determination the key manifest is unsynchronized based on the absence of one or more user credentials, transmitting the one or more absent user credentials to the host device for transmission to the secure component to synchronize the user credentials in the secure component with the user credential store managed by the server.

18. The method of claim 17, further comprising:

transmitting a request for user credential recovery; and participating in a user credential recovery by recovering user credentials from the secure component according to a user credential recovery configuration.

19. The method of claim 18, further comprising:

transmitting the user credential recovery configuration to the host device for transmission to the secure component, wherein the user credential recovery configuration indicates multi-factor authentication information for recovery of user credentials.

20. The method of claim 17, further comprising:

transmitting a user credential synchronization configuration to the host device for transmission to the secure component for responding to the user credential synchronization, wherein the user credential synchronization configuration indicates what information is synchronized, synchronization conditions, and synchronization security.

* * * * *